(12) United States Patent
Ganesh

(10) Patent No.: US 7,013,148 B1
(45) Date of Patent: Mar. 14, 2006

(54) METHOD FOR PROVIDING A CURRENT LOCATION OF A WIRELESS COMMUNICATION DEVICE

(75) Inventor: Rajamani Ganesh, Bedford, MA (US)

(73) Assignees: Verizon Corporate Services Group Inc., New York, NY (US); BBNT Solutions LLC, Cambridge, MA (US)

( * ) Notice: Subject to any disclaimer, the term of this patent is extended or adjusted under 35 U.S.C. 154(b) by 506 days.

(21) Appl. No.: 10/032,355

(22) Filed: Dec. 21, 2001

(51) Int. Cl.
*H04Q 7/20* (2006.01)
*H04M 11/04* (2006.01)

(52) U.S. Cl. .................. 455/456.1; 455/404.2
(58) Field of Classification Search ............ 455/414.2, 455/404.2, 440, 456.1, 457, 456.3, 456.5, 455/427, 12.1; 370/25, 142.1, 207.12; 342/452
See application file for complete search history.

(56) References Cited

U.S. PATENT DOCUMENTS

| | | | | |
|---|---|---|---|---|
| 5,086,394 A * | 2/1992 | Shapira | ........................ | 705/1 |
| 5,572,221 A * | 11/1996 | Marlevi et al. | ............ | 342/452 |
| 5,666,647 A * | 9/1997 | Maine | ....................... | 455/12.1 |
| 5,974,330 A | 10/1999 | Negishi | | |
| 6,112,074 A * | 8/2000 | Pinder | ..................... | 455/404.2 |
| 6,317,604 B1 * | 11/2001 | Kovach et al. | ........... | 455/456.5 |
| 6,327,471 B1 * | 12/2001 | Song | ............................ | 455/440 |
| 6,327,533 B1 * | 12/2001 | Chou | .......................... | 701/207 |
| 6,389,288 B1 * | 5/2002 | Kuwahara et al. | ........ | 455/456.6 |
| 6,400,956 B1 * | 6/2002 | Richton | .................... | 455/456.3 |
| 6,463,272 B1 * | 10/2002 | Wallace et al. | ........... | 455/404.2 |
| 6,553,232 B1 * | 4/2003 | Shaffer et al. | .............. | 455/440 |
| 6,609,005 B1 * | 8/2003 | Chern | ......................... | 455/457 |
| 6,694,143 B1 * | 2/2004 | Beamish et al. | .......... | 455/456.1 |
| 6,731,940 B1 * | 5/2004 | Nagendran | ............... | 455/456.1 |
| 6,745,028 B1 * | 6/2004 | Hutchinson | ................. | 455/427 |
| 6,813,502 B1 * | 11/2004 | Son et al. | ................. | 455/456.3 |
| 6,898,432 B1 * | 5/2005 | Jiang | ........................ | 455/456.1 |
| 2001/0004600 A1 * | 6/2001 | Son et al. | .................... | 455/456 |
| 2003/0060212 A1 | 3/2003 | Thomas | | |
| 2004/0058692 A1 | 3/2004 | Kall et al. | | |

OTHER PUBLICATIONS

James M. Zagami et al., Providing Universal Location Services Using a Wireless E911 Location Network, IEEE Communications Magazine, Apr. 1998, pp. 66-71.
US 6,731,928, 05/2004, Tanaka (withdrawn)*

* cited by examiner

*Primary Examiner*—William Trost
*Assistant Examiner*—Kiet Doan
(74) *Attorney, Agent, or Firm*—Leonard C. Suchyta, Esq.; Joel Wall, Esq.; Meschkow & Gresham

(57) ABSTRACT

A method (36) for providing a current location (35) of a wireless communication device (24) within a wireless communication network (20) calls for activating an automatic location identification (ALI) process in response to a request from an authorized requesting party. An indicator (106) of the current location (35) is provided to the authorized requesting party via a map-enabled web page (100).

20 Claims, 6 Drawing Sheets

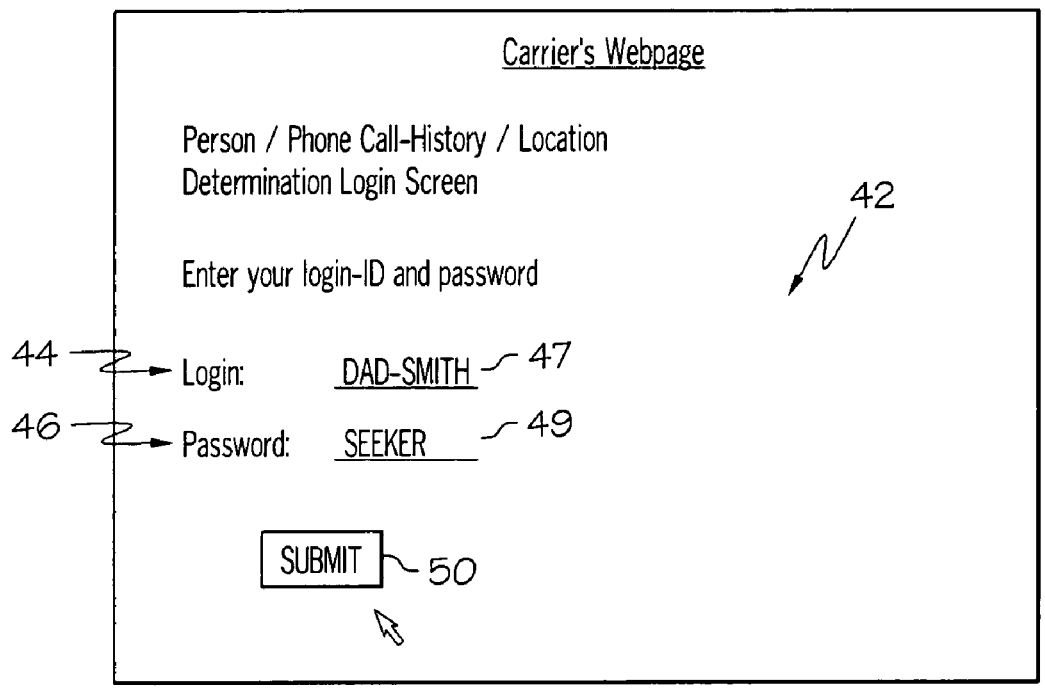

METHOD FOR PROVIDING A CURRENT LOCATION OF A WIRELESS COMMUNICATION DEVICE

RELATED INVENTION

The present invention is related to "Method For Providing Location Information Of A Wireless Communication Device," by Rajamani Ganesh, U.S. patent application Ser. No. 10/032,202, co-pending herewith.

TECHNICAL FIELD OF THE INVENTION

The present invention relates to the field of wireless communication networks. More specifically, the present invention relates to providing the current location of a wireless communication device in a wireless communication network to an authorized requesting party.

BACKGROUND OF THE INVENTION

Today's society is highly mobile. That is, individuals can move rapidly from one location to the next by utilizing automobiles, mass transit, bicycles, and the like. The advantages of communication any time and almost anywhere, advances in technology, and the affordability of wireless communication devices, such as cell phones, pagers, personal communications systems (PCS), and personal digital assistants (PDA) have resulted in a proliferation of these wireless communication devices in this mobile society. Indeed, many more individuals, particularly children, teenagers, and the elderly, recognizing the many advantages in being able to initiate and receive calls while away from home, are being enrolled in ever-increasing numbers to wireless communication services.

To parents and guardians, outfitting their dependents with wireless communication devices provides a means for their dependents to call for help in an emergency and a means for parents and their dependents to stay in touch. Thus, telecommunications provides parents and guardians with technologically facilitated control and supervision of their dependents.

Unfortunately, a problem for users of wireless communication devices, and particularly for those seeking to find them, is the apprehension that occurs when the user of the wireless communication device is not available via the wireless device, i.e., an individual does not answer the device when it rings or when wireless service is not available. Mobility, the main advantage offered by a wireless communication device, is also a disadvantage in these situations. For example, the parent or guardian unsuccessfully seeking to locate their dependent via the wireless device may not know where their dependent is because by using a wireless device, a dependent is not required to be at a fixed location to communicate with his or her guardians.

In 1996, the Federal Communications Commission (FCC) issued a Report and Order requiring all wireless carriers and cell phone manufacturers to provide the capability for automatically identifying to emergency dispatchers the location from which a wireless call is being made. The FCC's wireless 911 rules seek both to improve the reliability of wireless 911 services and to provide enhanced features generally available for wireline calls.

Timing for implementing the E-911 requirements is divided into two phases. Phase I requires wireless carriers to deliver to the emergency dispatcher the telephone number of a wireless handset originating a 911 call, as well as the location of the cell site or base station receiving the 911 call, which provides a rough indication of the caller's location. This phase was implemented by the end of 1998. Phase II requires carriers to deliver more specific latitude and longitude location information, known as Automatic Location Identification (ALI), to the dispatcher. The Phase II mandate establishes deployment schedules and sets accuracy and reliability requirements for ALI technologies.

Various techniques are being developed to locate wireless communication devices in response to the FCC E-911 Phase II mandate. These technologies encompass both network-based and handset-based equipment and processes.

Network-based technologies generally encompass time difference of arrival (TDOA) techniques, which calculate the location of a wireless device based on the speed the radio frequency signal reaches multiple nearby antennas, and angle of arrival (AOA). With AOA, cell sites identify the direction from which a signal is coming and then plot the direction of the incoming call based on a reading from two cell sites. Hand-set based technologies may employ the network of Global Positioning Satellites (GPS) or a hybrid combination of network-based and GPS to determine a current location of a wireless device. The current location, ascertained using GPS, is then communicated through the wireless communication network to a call center.

The current location of a wireless communication device, derived from ALI techniques, is provided in response to a 911 call initiated by a wireless device. Unfortunately, no mechanisms are in place for providing the current location of a wireless device to the general public when the wireless device is initiating anything other than a 911 call or not participating in a call of any kind. There may be no mechanisms in place because of the problems of logistics, i.e. making the information readily accessible by authorized individuals, and security, i.e. implementing safeguards to secure sensitive personal information from unauthorized individuals. In addition, there may be no mechanisms in place because of problems associated with interpretability, i.e. providing the current location information in a format that is readily interpreted by the authorized individual, and affordability.

SUMMARY OF THE INVENTION

Accordingly, it is an advantage of the present invention that a method is provided for supplying a current location of a wireless communication device within a wireless communication network.

It is another advantage of the present invention that a method is provided that takes advantage of current and upcoming Automatic Location Identification (ALI) technologies to determine a current location of the wireless device.

Another advantage of the present invention is that a method is provided that supplies the current location in a format that is readily interpreted by a concerned individual.

Yet another advantage of the present invention is that a method is provided having safeguards in place to prevent unauthorized individuals from receiving the current location information.

The above and other advantages of the present invention are carried out in one form by a method for providing a current location of a wireless communication device in a wireless communication network. The method calls for receiving a request for the current location from a requesting party and verifying that the requesting party is an authorized party. When the requesting party is the authorized party, the method further calls for activating a location determination process to determine the current location of the wireless communication device and supplying an indicator of the current location to the requesting party.

The above and other advantages of the present invention are carried out in another form by a method for supplying a current location of a wireless communication device within a wireless communication network. The method calls for providing a first web page having a requester log-in section. Following detection of a successful log-in attempt at the requester log-in section, a second web page is provided that has a device identifier field. Following detection of a device identifier of the wireless communication device in the device identifier field, a third web page is provided that has a map of a geographical area overlaid with an indicator of the current location. The current location is determined by activating a location determination process.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows a diagram of a first web page supplied by a service provider of the wireless communication network;

FIG. 4 shows a table of an exemplary user profile established during initiation of service to a wireless communication device in accordance with the present invention;

DETAILED DESCRIPTION OF THE PREFERRED EMBODIMENTS

Figure 1:
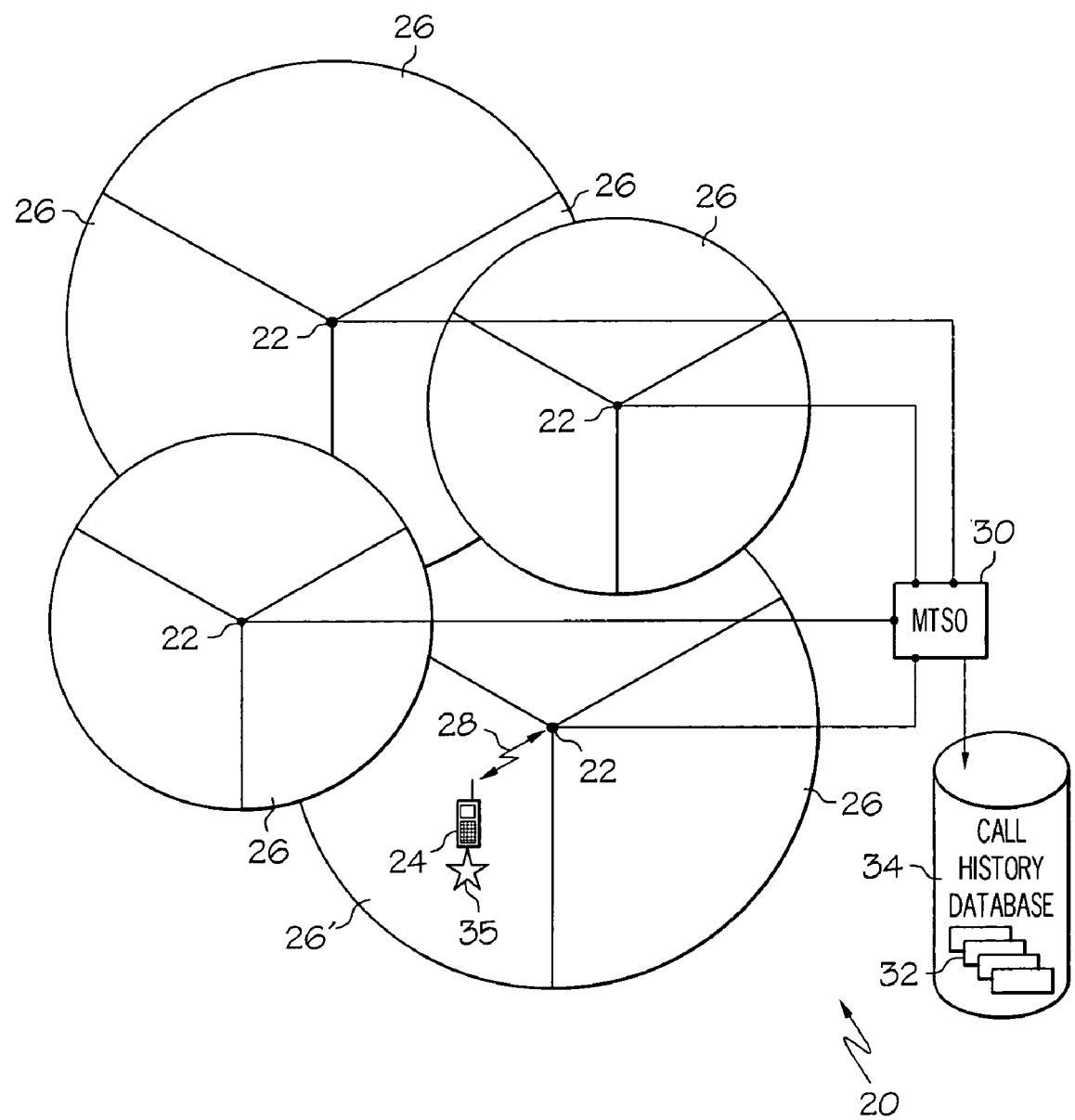
FIG. 1 shows a diagram of a wireless communication network employing a number of cell sites.

FIG. 1 shows a diagram of a wireless communication network 20 employing a number of transceiver sites, also known as cell sites 22. Wireless communication network 20 utilizes radio frequency (RF) cell sites 22 to transmit and receive RF signals to wireless communication devices 24, of which only one is shown. Generally, these cell sites 22 may be spaced from as little as one half mile apart in a metropolitan area and as great as twenty miles apart in a rural area to achieve acceptable results. Consequently, a large metropolitan area can include hundreds of individual cell sites 22. In addition, many cell sites 22 currently in use in large metropolitan areas take advantage of directional antennas (not shown) so that the service area of a single one of cell sites 22 is subdivided into a number of sectored coverage areas 26. By using directional antennas, each providing one hundred twenty to sixty degrees of directionality, respectively, the transmission area of cell sites 22 may be subdivided into three or six coverage areas 26.

Wireless communication device 24 may be a cell phone, a pager, a personal communications system (PCS), a personal digital assistant (PDA), and so forth that engages in wireless communication through one of cell sites 22, by techniques known to those skilled in the art.

Per convention, when wireless device 24 participates in a wireless phone call (either incoming or outgoing), a channel connection 28 is established between wireless communication device 24 and one of cell sites 22. Upon establishment of channel connection 28 through a call center, such as a mobile telephone switching office (MTSO) 30, also known as a "switch", the cellular service provider (carrier) collects call-history information about the wireless phone call. The call-history information includes, for example, the time, date, phone number called, duration of the call, and identifiers for one of cell sites 22 and the sector (i.e. directional antenna) in communication with wireless communication device 24 and through which the call is routed. This call-history information, or call record 32, is typically retained by the service provider in a comprehensive call history database 34 of call records 32 for the subscribers operating in wireless communication network 20. Call records 32 are utilized by the service provider of wireless communication network 20 for record keeping purposes, such as billing and for providing subscribers with enhanced services such as last numbers dialed, caller ID, and so forth.

The approximate location, i.e., one of coverage areas 26, of wireless communication device 24, hence its user, can be ascertained during instances of past calls by accessing particular call records 32 to determine identifiers for one of cell sites 22 and the sector (i.e. directional antenna) in communication with device 24 and through which the call is routed. However, the present invention provides a more accurate current location 35, generally represented in network 20 by a star, of wireless communication device 24, as discussed below.

Figure 2:
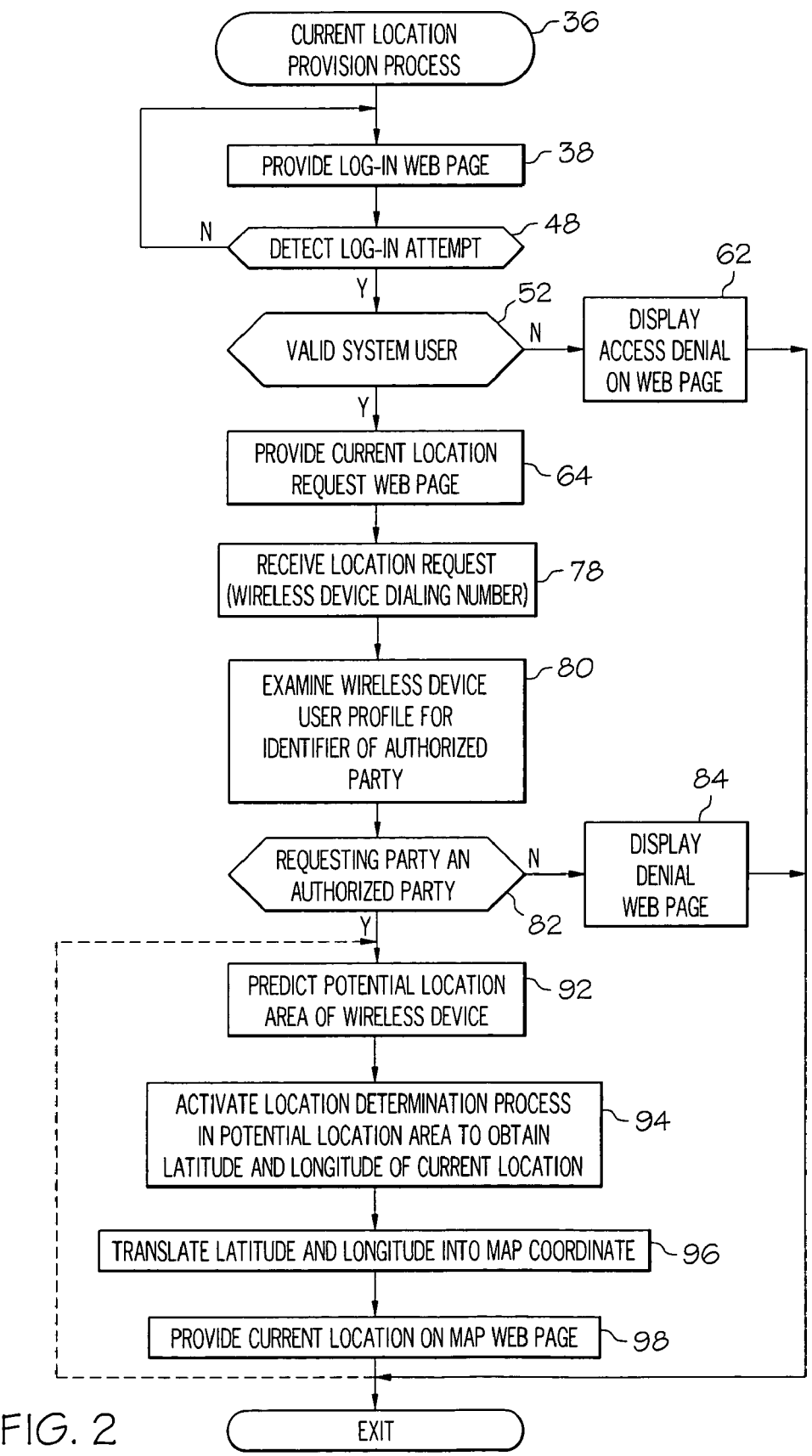
FIG. 2 shows a flow chart of a current location provision process in accordance with a preferred embodiment of the present invention.

FIG. 2 shows a flow chart of a current location provision process 36 in accordance with a preferred embodiment of the present invention. Current location provision process 36 is presented to a subscriber by a service provider of wireless communication network 20 (FIG. 1) as an enhanced service for permitting authorized location determination of wireless communication device 24 (FIG. 1). In a preferred embodiment, process 36 is implemented through executable code stored on computer-readable storage medium of a server system connected to the Internet. The executable code instructs the server system to provide various web pages maintained by the service provider, or contracted by the service provider to a third party, that are accessed via the Internet.

As known to those skilled in the art, a web page is a document created with Hypertext Markup Language (HTML) that is part of a group of hypertext documents or resources available on the World Wide Web and accessible via the Internet. The web page may be read using a software program known as a web browser that displays the web pages as formatted presentations, with any associated graphics, sound, and video, on a computer screen. The present invention employs web pages and uses the Internet as a transport mechanism for providing current location 35 (FIG. 1) through the execution of process 36. Alternatively, the location information may be provided through phone, fax, or electronic mail.

Process 36 begins with a task 38. At task 38, a log-in web page is provided.

Referring to FIG. 3 in connection with task 38, FIG. 3 shows a diagram of a first web page, or a log-in web page 40, supplied by a service provider of wireless communication network 20 (FIG. 1). Log-in web page 40 is accessed when a requesting party enters a Uniform Resource Locator (URL) for log-in web page 40. The URL describes the type of access method being used (for example, http) and the server location which hosts the Web site of which log-in web page 40 is a part of. Log-in web page 40 is a fill-in form that includes a requester log-in section 42 having a Login field 44 and a Password field 46.

Following the provision of log-in web page 40, process 36 proceeds to a query task 48. At query task 48, process 36 determines whether a log-in attempt is detected. That is, query task 48 determines if requester identifiers in the form of a requester log-in identifier 47 and a requester password 49 are entered into Login field 44 and Password field 46, respectively, of requester log-in section 42 and submitted through activation of a SUBMIT field 50 provided with log-in web page 40. SUBMIT field 50 is an image area in log-in web page 40 on which a user can click to attempt to continue the execution of process 36. When query task 48 fails to detect a log-in attempt, process 36 loops back to task 38 to continue provision of log-in web page 40 and to await a log-in attempt. However, when a log-in attempt is detected at query task 48, process 36 proceeds to a query task 52.

At query task 52, process 36 determines whether the log-in attempt detected at query task 48 is being performed by a valid system user. Process 36 operates under the prerequisite that a service agreement has been established when service is initiated for wireless communication device 24 (FIG. 1), or in response to an upgrade of services provided to wireless communication device 24.

FIG. 4 shows a table of an exemplary user profile 54 established during initiation of service to wireless communication device 24 in accordance with the present invention. User profile 54 contains authorized party identifiers 56 of individuals who are valid system users and are authorized to receive location information of wireless communication device 24 at any time. User profile 54 is generally created and maintained at wireless communication device.

In an exemplary embodiment, user profile 54 includes two authorized parties, each identified by distinct authorized party identifiers 56 that include a unique log-in identifier 58 and a unique password 60. Individuals who have authorized party identifiers 56 in particular user profiles 54, and have subscribed to the current location provision service, are considered valid system users. Consequently, the authorized party identifiers 56 for all valid system users may be compiled in a single database (not shown) of valid system users. This single database may also correlate the appropriate requester password, such as requester password 49, with log-in identifier 58.

Referring back to FIGS. 2–3, when query task 52 determines that Login field 44 and/or Password field 46 fails to contain information identifying a valid system user, process 36 proceeds to a task 62.

At task 62, process 36 displays an access denial message either on first web page 40, or alternatively, on a new web page (not shown). Following task 62, process 36 exits without releasing location information to an invalid system user.

However, when query task 52 determines that Login field 44 and Password field 46 contain information identifying a valid system user, for example, one of authorized party identifiers 56, process 36 proceeds to a task 64 where a second web page is provided.

Figure 5:
FIG. 5 shows a diagram of a second web page provided by the service provider following a successful log-in attempt through the first web page of FIG. 3.

FIG. 5 shows a diagram of a second web page, or a current location request web page 66, provided by the service provider following a successful log-in attempt through log-in web page 40 (FIG. 3). Current location request web page 66 includes a dialing number field 68 provided for the entry of a dialing number 72 of wireless communication device 24. Dialing number 72 is the number dialed when attempting to establish contact with device 24.

Dialing number 72 is submitted through activation of a SUBMIT field 76 provided with location information request web page 66. SUBMIT field 76 is an image area in current location request web page 66 on which a user can click to request current location 35 (FIG. 1) for wireless communication device 24 (FIG. 1).

Referring back to process 36 (FIG. 2), following providing task 64, process control proceeds to a task 78. At task 78, a location request in the form of dialing number 72 (FIG. 5) is received.

Following task 78, a task 80 is performed. At task 80, user profile 54 (FIG. 4) for wireless communication device 24 (FIG. 1) is examined to obtain authorized party identifiers 56 (FIG. 4).

A query task 82 is performed in cooperation with task 80. Query task 82 determines whether a requesting party is an authorized party. More specifically, query task 82 compares requester log-in identifier 47 (FIG. 3) and requester password 49 (FIG. 3) with authorized party identifiers 56 (FIG. 4) within user profile 54 (FIG. 4). When query task 82 fails to match requester log-in identifier 47 and requester password 49 with authorized party identifiers 56 of user profile 54, program control proceeds to a task 84 in which a denial web page is presented to the requester.

Figure 6:
FIG. 6 shows a diagram of an access denial web page provided by the service provider following an unsuccessful attempt to obtain location information of a wireless communication device.

Referring to FIG. 6 in connection with task 84, FIG. 6 shows a diagram of an access denial web page 86 provided by the service provider following an unsuccessful attempt to obtain current location 35 (FIG. 1) of wireless communication device 24 (FIG. 1) at task 82. Access denial web page 86 may contain various possible explanations 88 describing why access to information location was denied, including the "login-ID is not included in the mobile-phone's user profile." Access denial web page 86 may provide an option, in the form of a query 90, to receive current location 35 (FIG. 1) later, as discussed below. Following the display of access denial web page 86 at task 84, current location provision process 36 exits without releasing current location 35 to an unauthorized requesting party.

With reference back to query task 82 of process 36 (FIG. 2), when query task 82 verifies a match between requester log-in identifier 47 and requester password 49 with authorized party identifiers 56 of user profile 54, program control proceeds to a task 92. In other words, the requesting party is an authorized requesting party. At task 92, a potential location area of wireless communication device 24 is predicted.

The potential location area is a particular one of coverage areas 26 (FIG. 1) in which wireless communication device 24 is currently located. For example, device 24 is currently located in one of coverage areas 26, or a first coverage area 26' (FIG. 1). First coverage area 26' can be ascertained when wireless communication device 24 is powered on and has registered with network 20 (FIG. 1). Through conventional registration processes, when device 24 is powered on or as device 24 moves from one coverage area 26 to another coverage area 26, device 24 exchanges messaging with MTSO 30, i.e., the switch, (FIG. 1) via one of cell sites 22 to update MTSO 30 of its location. In this manner, MTSO 30 is kept informed of the whereabouts of wireless communication device 24 so that calls may be directed to the appropriate one of cell sites 22.

In an alternative embodiment, the potential location area of wireless communication device 24 may be ascertained by accessing comprehensive call history database 34 (FIG. 1) and selecting a latest one of call records 32 in date and time of day that is associated with device 24. As discussed previously, each of call records 32 includes, for example, the time, date, and identifiers for one of cell sites 22 and the sector (i.e. directional antenna) in communication with wireless communication device 24 and through which the call is routed. The one of cell sites 22 and the particular sector identifies the particular one of coverage areas 26, i.e. first coverage area 26'. Thus, the potential location area is predicted to be the one of coverage areas 26 (FIG. 1) in which device 24 was last used as found in call records 32. Such an approach may be useful for predicting the potential location area of wireless communication device 24 when device 24 is not currently registered.

Following task 92, a task 94 it performed. At task 94, a location determination process is activated in first coverage area 26' to determine current location 35 (FIG. 1). The location determination process yields, for example, a latitude and a longitude of current location 35. In a preferred embodiment, a location determination process can be any of the various Automatic Location Identification (ALI) technologies developed in response to the Federal Communications Commission's Phase II mandate for enhanced-911 (E-911).

Thus, the location determination process may be a network-based solution that measures certain signal characteristics such as time of arrival or angle of arrival of the desired transmitted signal as received at several receiver stations from which a location is estimated. Alternatively the location determination process may be a handset-based solution or a hybrid solution, which may employ a Global Positioning System (GPS) built into device 24 that reports current location 35 (FIG. 1) to network 20 (FIG. 1) for relay to a Public Safety Answering Point.

As per the E-911 Phase II mandate, the FCC requires all network-based ALI service providers to provide the current location of a wireless communication device seeking emergency services, with an accuracy of one hundred meters sixty-seven percent of the time and with an accuracy of three hundred meters ninety-five percent of the time. For all handset-based ALI service providers, the FCC requires the current location to be provided with an accuracy of fifty meters sixty-seven percent of the time and one hundred fifty meters ninety five percent of the time.

Regardless of the particular technology utilized by the service provider of network 20, task 94 activates the location determination process to obtain the latitude and longitude, or equivalent location coordinates, of current location 35 (FIG. 1) without the need for the user of wireless communication device 24 to dial 911. Rather, the location determination process is activated by the service provider in any given area, and current location 35 of device 24 is determined if device 24 is powered on, current location 35 being within the accuracy requirements set forth in the Phase II mandate. If, however, wireless communication device 24 is not on, or not located, first coverage area 26' (FIG. 1) determined by accessing a latest one of call records 32 in database 34 may be utilized to provide approximate location information.

A task 96 is performed in cooperation with task 94. At task 96, the latitude and longitude of current location 35 obtained at task 94 is translated, as needed, to an indicator such as a map coordinate that indicates or represents current location 35.

Next a task 98 provides the indicator, or map coordinate, of current location 35 on a map web page.

Figure 7:
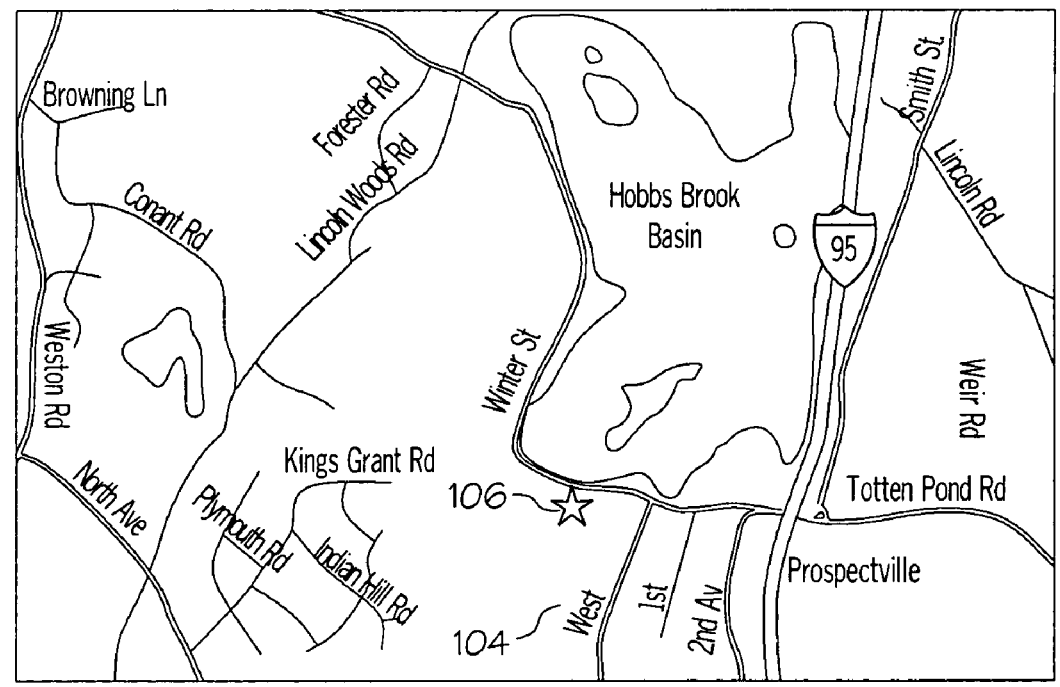
FIG. 7 shows a diagram of a map web page provided by the service provider of a geographical area having an indicator of a current location of a wireless communication device in response to the execution of the current location provision process of FIG. 2.

Referring to FIG. 7 in connection with task 98, FIG. 7 shows a diagram of a third web page, or a map web page 100, supplied by the service provider of a map 102 of a geographical area 104 having an indicator 106 of current location 35, in the form of a star, for wireless communication device 24 (FIG. 1) in response to the execution of current location provision process 36 (FIG. 2). In particular, indicator 106 obtained at task 96 is positioned in geographical area 104 of map 102 as indicator 106. As discussed in detail above, current location 35 may have an accuracy of within three hundred meters.

In addition, map web page 100 includes a time 108 (i.e. 10:55:32 AM) at which wireless device 24 was determined to be at current location 35. Although not shown in map web page 100, additional location information that may be included could be date, location of the one of cell sites 26 (FIG. 1) through which wireless device 24 communicates at time 108, and/or an overlay of first coverage area 26' at time 108.

In an exemplary implementation, map 102 is presented using a mapping program, such as MapQuest, supplied by MapQuest.com, Inc., Navigation Technologies. MapQuest provides a range of mapping and routing solutions which allows users to map-enable their Web sites, such as map web page 100. In addition, MapQuest provides map manipulation capabilities such as pan, zoom in/out, and so forth.

As shown in map web page 100, a requester can readily determine current location 35, represented by indicator 106, of wireless communication device 24 (FIG. 1) from map 102.

Following task 98, current location provision process 36 may optionally loop back to task 92, as denoted by a dashed line, to provide indicator 106 of current location 35 at a later time. Such a scenario may occur when access denial web page 86 (FIG. 6) or some other equivalent information is provided stating possible explanations as to why current location cannot be provided, for example, "the mobile phone is turned off." Query 90 (FIG. 6) provides an option for receiving indicator 106 of current location 35 at a later time if, for example, wireless communication device 24, is currently not located. In another scenario, the optional loop back to task 92 enables the periodic repetition of activating task 94 and providing task 98 to track movement of wireless communication device 24 throughout wireless communication network 20 (FIG. 1).

Following task 98 after a single iteration of process 36 to provide indicator 106 of current location 35, or following a number of iterations of tasks 92, 94, 96, and 98, current location provision process 36 exits having provided to a requester the map 102 (FIG. 7) that is readily interpreted to determine current location 35 of wireless communication device 24 (FIG. 1).

In summary, the present invention teaches of a current location provision process for supplying a current location of a wireless communication device within a wireless communication network. The method activates an Automatic Location Identification (ALI) process implemented in response to the E-911 Phase II mandate to determine a current location of the wireless device. In addition, by employing ALI processes required through the FCC Phase II mandate and billing the users of the location information provision service, the service provider gains a valuable revenue source at little to no additional cost. An indicator of the current location is presented in a map on a map web page to authorized requesting party. Log-in verification safeguards ensure that unauthorized individuals are prevented from receiving the current location information.

Although the preferred embodiments of the invention have been illustrated and described in detail, it will be readily apparent to those skilled in the art that various modifications may be made therein without departing from the spirit of the invention or from the scope of the appended claims. For example, those skilled in the art will appreciate that the current location can be displayed in wide variety of mapping formats. Alternatively, the current location can be communicated to the requesting party via e-mail, telephone, or fax.

What is claimed is:

1. A method for providing a current location of a wireless communication device in a wireless communication network, wherein a service provider maintains a comprehensive call history database of said wireless communication network, said comprehensive call history database including call records of past calls in which said wireless communication device participated, and said method comprising:
   receiving a request for said current location from a requesting party;
   verifying that said requesting party is an authorized party;
   when said requesting party is said authorized party, activating a location determination process to determine said current location of said wireless communication device, said activating operation including;
      predicting a potential location area of said wireless communication device, said predicting operation including determining said potential location area in response to wireless communication between said wireless communication device and a transceiver site of said wireless communication network by ascertaining said potential location area from said comprehensive call history database; and
      initiating said location determination process in said potential location area; and
   supplying an indicator of said current location to said requesting party.

2. The method as claimed in claim 1 further comprising establishing, prior to said receiving operation, a user profile for said wireless communication device, said user profile containing an identifier for said authorized party.

3. The method as claimed in claim 2 wherein said verifying operation comprises matching a requesting party identifier of said requesting party with said identifier of said authorized party.

4. The method as claimed in claim 1 further comprising detecting, prior to said receiving operation, a log-in attempt at a web page of a service provider of said wireless communication network, said request being received via said web page following successful completion of said log-in attempt.

5. The method as claimed in claim 1 wherein said request includes a dialing number of said wireless communication device.

6. The method as claimed in claim 1 wherein said determining operation determines from said comprehensive call history database a coverage area in which said wireless communication device was last used as found in said call records, said coverage area being said potential location area.

7. The method as claimed in claim 1 wherein said current location is identified by a latitude and a longitude.

8. The method as claimed in claim 7 further comprising translating said latitude and said longitude into said indicator of said current location.

9. The method as claimed in claim 1 wherein said supplying operation comprises displaying said indicator of said current location on a map of a geographical area in which said wireless communication device is positioned.

10. The method as claimed in claim 1 wherein said supplying operation comprises providing said indicator of said current location via a web page.

11. The method as claimed in claim 1 wherein said supplying operation includes presenting a time at which said wireless communication device is at said current location.

12. The method as claimed in claim 1 further comprising periodically repeating said activating and supplying operations to track a movement of said wireless communication device.

13. A method for providing a current location of a wireless communication device in a wireless communication network comprising:
   receiving a request for said current location from a requesting party;
   verifying that said requesting party is an authorized party;
   when said requesting party is said authorized party, activating a location determination process to determine said current location of said wireless communication device, said activating operation including predicting a potential location area of said wireless communication device, said predicting operation being performed irrespective of a current registration of said wireless communication device in said wireless communication network, and initiating said location determination process in said potential location area; and
   supplying an indicator of said current location to said requesting party.

14. A method for providing a location of a wireless communication device in a wireless communication network, said method comprising:
   receiving a request for said location from a requesting party;
   verifying that said requesting party is an authorized party;
   when said requesting party is said authorized party, activating a location determination process to determine said location of said wireless communication device, said activating operation including:
      predicting a potential location area of said wireless communication device;
      when said wireless communication device is detectable in said potential location area, initiating said location determination process in said potential location area to determine a current location of said wireless communication device and identifying said current location as said location; and
      when said wireless communication device is undetectable in said potential location area, utilizing said potential location area as said location; and
   supplying an indicator of said location to said requesting party.

15. The method as claimed in claim 14 wherein said predicting operation is performed irrespective of a current registration of said wireless communication device in said wireless communication network.

16. The method A method as claimed in claim 14 wherein said predicting operation comprises ascertaining a coverage area in which said wireless communication device was most recently located, said coverage area being said potential location area.

17. The method as claimed in claim 16 further comprising determining said coverage area in response to a registration of said wireless communication device within said wireless communication device.

18. The method as claimed in claim 14 wherein a service provider of said wireless communication network maintains a comprehensive call history database of said wireless communication network, said comprehensive call history database including call records of calls in which said wireless communication device participated, and said predicting operation comprises ascertaining said potential location area from said comprehensive call history database.

19. The method as claimed in claim 18 wherein said ascertaining operation determines from said comprehensive call history database a coverage area in which said wireless communication device was last used as found in said call records, said coverage area being said potential location area.

20. The method as claimed in claim 14 further comprising presenting a time at which said wireless communication device is at said location.

* * * * *